United States Patent
Montini et al.

(10) Patent No.: US 8,416,763 B1
(45) Date of Patent: Apr. 9, 2013

(54) SYSTEM AND METHOD FOR PROVIDING QUALITY INTER-DOMAIN NETWORK TIME TRANSPORT

(75) Inventors: Laurent Montini, Saint-Arnoult-en-Yvelines (FR); William M. Townsley, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 969 days.

(21) Appl. No.: 12/271,804

(22) Filed: Nov. 14, 2008

(51) Int. Cl.
*H04J 3/06* (2006.01)

(52) U.S. Cl.
USPC .......................................... 370/350; 370/508

(58) Field of Classification Search ................... 370/350, 370/508
See application file for complete search history.

(56) References Cited

U.S. PATENT DOCUMENTS

| | | | |
|---|---|---|---|
| 4,507,781 A | 3/1985 | Alvarez, III et al. |
| 4,569,042 A | 2/1986 | Larson |
| 5,357,613 A | 10/1994 | Cantrell et al. |
| 5,485,457 A | 1/1996 | Aramaki |
| 5,926,461 A | 7/1999 | Habermann et al. |
| 6,012,096 A | 1/2000 | Link et al. |
| 6,128,318 A | 10/2000 | Sato |
| 6,366,563 B1 | 4/2002 | Weldon et al. |
| 6,665,316 B1 | 12/2003 | Eidson |
| 6,697,382 B1 | 2/2004 | Eatherton |
| 6,798,742 B1 | 9/2004 | Mawhinney et al. |
| 6,807,156 B1 | 10/2004 | Veres et al. |
| 6,868,094 B1 | 3/2005 | Bordonaro et al. |
| 6,976,087 B1 | 12/2005 | Westfall et al. |
| 7,027,718 B1 | 4/2006 | Ohishi et al. |
| 7,035,210 B2 | 4/2006 | Walles |
| 7,088,718 B1 | 8/2006 | Srivastava |
| 7,111,073 B1 | 9/2006 | Jain et al. |
| 7,149,916 B1 | 12/2006 | Marino |
| 7,415,044 B2 | 8/2008 | Kallstenius |
| 7,519,006 B1 | 4/2009 | Wing |
| 7,568,045 B1 | 7/2009 | Agrawal |
| 7,573,914 B2 | 8/2009 | Ilnicki et al. |
| 7,768,937 B2 | 8/2010 | Isambart et al. |
| 7,773,606 B2 | 8/2010 | Dobjelevski et al. |
| 7,787,438 B2 | 8/2010 | Dowse |
| 8,000,251 B2 | 8/2011 | Epps et al. |
| 2004/0141527 A1 | 7/2004 | Bennett et al. |

(Continued)

OTHER PUBLICATIONS

Cisco Systems, Inc. "Network-assisted Time Distribution: Introduction to IEEE1588-2008 Transparent Clock," CPOL #959204, 23 pgs., 2008.

(Continued)

*Primary Examiner* — Sai-Ming Chan
(74) *Attorney, Agent, or Firm* — Patent Capital Group

(57) ABSTRACT

A method is provided in one example embodiment and includes providing a time protocol assistant associated with a time-synchronized domain (TSD). The TSD includes a set of nodes that are synchronized to a same time source. The TSD has defined egress and ingress edge points where bidirectional measurements can be made and the egress and ingress edge points are coupled to the time protocol assistant. The method also includes synchronizing one or more packets flowing through a network that includes the TSD through the same time source. In more specific embodiments, the nodes are synchronized to the same time source via the network and the same time source is a grandmaster clock that synchronizes one or more transparent clocks. In yet other embodiments, the transparent clocks manipulate precision time protocol (PTP) packets sent by the grandmaster clock.

22 Claims, 11 Drawing Sheets

U.S. PATENT DOCUMENTS

| | | | |
|---|---|---|---|
| 2005/0114793 A1 | 5/2005 | Jung | |
| 2006/0034188 A1 | 2/2006 | Oran et al. | |
| 2006/0104218 A1 | 5/2006 | Kako | |
| 2006/0203851 A1* | 9/2006 | Eidson | 370/503 |
| 2007/0016817 A1 | 1/2007 | Albonesi et al. | |
| 2007/0168748 A1 | 7/2007 | Musoll | |
| 2007/0220133 A1 | 9/2007 | Park | |
| 2007/0274227 A1 | 11/2007 | Rauscher et al. | |
| 2008/0031283 A1 | 2/2008 | Curran-Gray et al. | |
| 2008/0089364 A1 | 4/2008 | Barry et al. | |
| 2008/0175275 A1 | 7/2008 | Garner et al. | |
| 2008/0225897 A1 | 9/2008 | Bryant et al. | |
| 2009/0147806 A1 | 6/2009 | Brueckheimer | |
| 2009/0190482 A1 | 7/2009 | Blair | |
| 2009/0231191 A1* | 9/2009 | Wu et al. | 342/357.09 |
| 2009/0310625 A1 | 12/2009 | Roberts et al. | |
| 2010/0039939 A1* | 2/2010 | Wang | 370/238 |
| 2010/0074278 A1 | 3/2010 | Dobjelevski et al. | |
| 2011/0286472 A1* | 11/2011 | Williams et al. | 370/474 |

OTHER PUBLICATIONS

U.S. Appl. No. 12/271,812, "System and Method for Providing Quality Inter-Domain Netwok Time Transport," filed Nov. 14, 2008, Inventor(s) Laurent Montini, et al.

USPTO Mar. 16, 2011 Final Office Action from U.S. Appl. No. 12/271,812.

Eidson, John C., "An Overview of Clock Synchronization Using IEEE 1588," *Measurement, Control, and Communication Using IEEE 1588 (Advances in Industrial Control Series)*; Publisher: Springer Verlag © 2006; pp. 35-58 (24 pages).

USPTO Jun. 15, 2011 After Final Response to Office Action from U.S. Appl. No. 12/271,812.

USPTO Jul. 12, 2011 Notice of Allowance from U.S. Appl. No. 12/271,812.

Anagnostakis, Kosta G., et al., "cing: Measure Network-Internal Delays using only Existing Infrastructure," IEEE INFOCOM 2003, 10 pages.

Barford, Paul, et al., "A Comparison of Probe-based and Router-based Methods for Measuring Packet Loss," UW Technical Report, Sep. 2003, 14 pages.

Davie, et al., "An Expedited Forwarding PHB (Per-Hop Behavior)," RFC 3246, The Internet Society, Mar. 2002; 17 pages; http://www.ietf.org/rfc/rfc3246.txt.

Duffield, N.G., et al., "Trajectory Sampling for Direct Traffic Observation," IEEE/ACM Transactions on Networking, vol. 9, Issue 3, Jun. 2001, 13 pages.

Lai et al., "A Framework for Internet Traffic Engineering Measurement," IETF Draft, draft-ietf-tewg-measure-00.txt, ietf.org, Aug. 2001, 18 pages.

Mills, "Algorithms for Synchronizing Network Clocks," IETF RFC 956, Sep. 1985, 27 pages; http://www.ietf.org/rfc/rfc956.txt.

Mills, "DCN Local-Network Protocols," IETF RFC 891, Dec. 1983, 27 pages; http://www.ietf.org/rfc/rfc891.txt.

Mills, "DCNET Internet Clock Service," IETF RFC 778, Apr. 19, 1981, 5 pages; http://www.ietf.org/rfc/rfc778.txt.

Mills, "Network Time Protocol (NTP)," IETP RFC 958, Sep. 1985, 15 pages; http://www.ietf.org/rfc/rfc958.txt.

Mills, "Network Time Protocol (Version 3) Specification, Implementation and Analysis," Internet Engineering Task Force Network Working Group Request for Comments (RFC) 1305, Mar. 1992, 120 pages; http://www.ietf.org/rfc/rfc1305.txt.

Mills, Network Time Protocol Version 4 Reference and Implementation Guide, NTP Working Group Technical Report Jun. 1, 2006, University of Delaware, Jun. 2006; 90 pages.

* cited by examiner

SYSTEM AND METHOD FOR PROVIDING QUALITY INTER-DOMAIN NETWORK TIME TRANSPORT

TECHNICAL FIELD OF THE INVENTION

This invention relates in general to the field of communications and, more particularly, to a system and a method for providing quality inter-domain network time transport.

BACKGROUND OF THE INVENTION

Networking architectures have grown increasingly complex in communication environments. This complexity has resulted in numerous protocols being implemented to ensure that network elements and packets are synchronized via some clock source. There is an emerging need to distribute accurate time and frequency over packet switched networks for a variety of applications.

When offering time and/or frequency transport from a customer over one or more service provider networks, or between network domains within a large enterprise, inter and intra domain issues typically arise. For example, a service provider may synchronize its own network to one clock source, but be required to transport time from a different source [and time-scale] over its network, as part of a contracted service. Traversing multiple domains also introduces new security problems and demands on equipment. For example, 'on-path hardware support' for time-stamping may exist for aiding time transport, but hardware support for authenticating the timestamp in transit (as an atomic operation or one that adjusts for time variants of the computed and applied hash) may not.

Hence, the ability to offer a system or a protocol that offers an effective synchronization for network communications and elements (without hindering system speeds, creating unnecessary overhead, or overtaxing processing capabilities of network components) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes providing a time protocol assistant associated with a time-synchronized domain (TSD). The TSD includes a set of nodes that are synchronized to a same time source. The TSD has defined egress and ingress edge points where bidirectional measurements can be made and the egress and ingress edge points are coupled to the time protocol assistant. The method also includes synchronizing one or more packets flowing through a network that includes the TSD through the same time source. In more specific embodiments, the nodes are synchronized to the same time source via the network and the same time source is a grandmaster clock that synchronizes one or more transparent clocks. In yet other embodiments, the transparent clocks manipulate precision time protocol (PTP) packets sent by the grandmaster clock.

Figure 1:
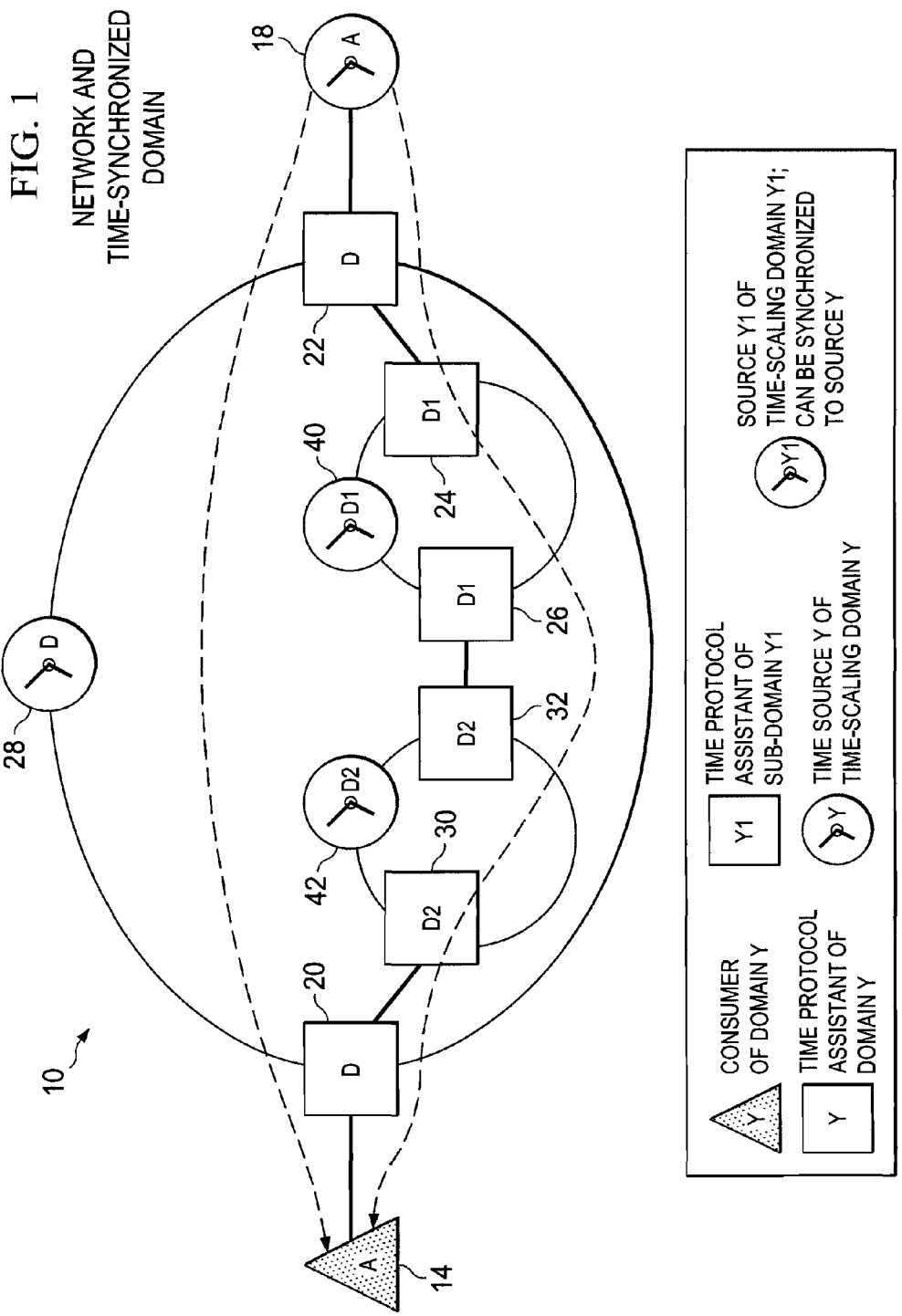
FIG. 1 is a simplified block diagram of a communication system for a network and time-synchronized domain in accordance with one embodiment of the present invention.

Turning to FIG. 1, FIG. 1 is a simplified block diagram of a communication system 10 for addressing time synchronization in a network environment. FIG. 1 includes a network and a time-synchronized domain. In terms of some of the terms being used to describe some of the operations and activities associated with time-synchronized domains, in certain embodiments of the present invention, there are a number of networks and sub-networks. Generally, the network is the entire operator or service provider network. The sub-network can be part of the network (for example, the core, the aggregation, and/or the access parts of the network). Also present is the time synchronized domain and sub-domains (TSD and sub-TSD). The domain can use the same clock/time source in a network or sub-network. More than one clock/time source can be used in a network (e.g., one clock source for one sub-network). Typically, for every clock source, there exists a time-scaling domain. Secondary clock sources, i.e. a clock source synchronized to a main clock source, could create a time-scaling sub-domain.

For purposes of illustrating the techniques of communication system 10, it is important to understand the somewhat esoteric communications that may be traversing the network and that provide clock sourcing to any given network element. The following foundational information may be viewed as a basis from which the present invention may be properly explained. Such information is offered earnestly for purposes of explanation only and, accordingly, should not be construed in any way to limit the broad scope of the present invention and its potential applications.

Time synchronization is dependent on delay variation and asymmetry of the path between the time source (i.e. server or master) and a time consumer (i.e. client or slave). Any attempt at reducing the delay variation and the asymmetry helps improve the quality (accuracy, stability, and precision) of recovered time.

Network time protocol (NTP) stratum servers (or, equivalently, IEEE1588 precision time protocol (PTP) Boundary Clock (BC) functions) can provide mechanisms to offer high-quality time to a client, but these suffer from several drawbacks. Firstly, the NTP stratum server or PTP BC should be synchronized with a primary stratum server or grandmaster in order to act as a time relay. This synchronization causes each relay to inherit the time-scale of the source, which in a multi-domain environment may be impractical or impossible for the terms of service. Secondly, cascading relays degrade the end time quality and settling time. While this can be compensated by using very high quality oscillators, or by reducing the number of relays, it generally decreases the quality of the transferred time.

Precision time protocol (PTP) is a two-way transfer time protocol that introduces a transparent clock (TC) functionality. One feature of the TC is that it does not require time synchronization to a grandmaster: making this clock transparent to time synchronization into the time domain. The on-path delay measurements at each node, and on each link, are passed to the PTP client in order to allow it to optimize its time synchronizing process as accurately as possible, without synchronizing to the same time source as the network over which the PTP packets pass. This solves one of the inter-domain problems listed above, though it introduces others that make it difficult to deploy in an inter-domain environment.

For example, in order to achieve a quality time transfer, TC-mode requests time stamping of in-transit PTP packets by each node. Further, the stamped packets traverse identical paths in both directions between two time distribution endpoints, which while not impossible to engineer, is an operational burden on Internet Protocol (IP) networks and can be particularly difficult for path or node failover mechanisms. In addition, when crossing inter-domain trust boundaries, the involvement of nodes along the path of the PTP packets brings additional security concerns. On-path corrections should not be a part of the end-to-end client/server authentication without proper key distribution between nodes, and efficient mechanisms to authenticate just the portions of the packet that each node touches.

Thus, as is evident from these discussions, there is an emerging need to distribute accurate time [and frequency] over packet switched networks for a variety of applications. Example embodiments of the present invention do not necessarily focus on any one specific application. Instead, communication system 10 offers new mechanisms to achieve the transfer of quality time in intra-domain and inter-domain scenarios.

In accordance with the techniques and teachings of the present invention, communication system 10 provides a number of methods in support of time transport across multiple network domains each with varying time scales from one another, as well as the originating time client or server. Example methods can include: 1) application of transparent clock (TC) techniques to time-synchronized domains (TSDs); 2) definitions of inter-domain interfaces between TSDs and methods for calculating a one-way delay based on the best information and techniques available on the link between TSDs; 3) a discovery mechanism to exchange characteristics between TSDs; and 4) a specific mechanism to aid in transporting authentication information for time correction values that does not require specific hardware support for authenticating a timestamp or a correction value inserted by an on-path device.

Thus, a TSD can be defined and then inter-domain scenarios are defined that account for various permutations of this configuration. As a general statement, example embodiments of the present invention offer a TSD and, from this platform, a transparent clock can be implemented. One important use of the transparent clock could be the ability to carry someone else's time over your network without having to synchronize to their time.

The main difference between boundary clocks and transparent clocks is that a transparent clock does not distribute the time from its local clock. Rather, it manipulates the PTP packets sent by a grandmaster clock. Thus, a transparent clock is synchronized directly by the grandmaster clock. The problem of cascaded control loops does not appear. This is one justification for proposing the transparent clock mechanism. Packets that flow across different time scales can be corrected in transit such that they can end up in the same time scale and the same time source.

In terms of advantages of certain embodiments of the present invention, example embodiments of the present invention can allow transport of time from one time source over a network that is synchronized to another time source. Furthermore, such an approach takes advantage of time synchronization and hardware time stamping functions at the edge of time-synchronized domains (TSDs), so as not to necessarily require hardware support at each node along the path. The architecture can also define auto-discovery techniques for TSDs, to simplify configuration. Additionally, such an approach includes security mechanisms tailored to the application, which do not require additional hardware support for authentication of on-path timestamps.

From a broad perspective in studying the inherent problem of clock synchronization, it would be ideal if all time sources were synchronized on the same clock. Similarly, there are different time scales and, again, it would be helpful if all entities had congruency in their chosen time scales. However, realistically, this does not occur. In more specific terms, for a peer-to-peer residence time and link delay correction model, there is a residence time computation (as could be implemented in IEEE1588-2008 TC). The residence time for each such event message can be computed for each egress port as: <residenceTime>=egress timestamp−ingress timestamp. When a time transfer packet passes through a node (e.g., a switch or a router), it is subject to processing and queuing delays that degrade its accuracy. Generally, there are two methods of dealing with this: 1) fail to transfer packet [boundary clock approach]; and 2) correct for the delays using transparent clock approach.

When providing time transport service to a customer, the transport should be aligned with the client's time scale and time source. However, an entity delivering this service does not want to necessarily be synchronized to the client's time scale and time source. Said otherwise, the product should match the client's parameters, but the operational activity of the service provider should remain within their own province.

In regards to more specific terminology discussed herein, frequency synchronization relates to the alignment of clocks in frequency, a process that is also referred to as syntonization. Phase synchronization implies that the two clocks are aligned in phase, a process that is also referred to as relative-time synchronization. Time synchronization is also referred to as time-of-day synchronization or wall-clock synchronization, where the clocks in question are traceable to a common, universal, time-base such as UTC. Note that if two clocks are synchronized in time/phase then they are also synchronized in frequency.

In terms of the performance of a given clock, for accuracy, this addresses the mean of the time or frequency error between the clock under test and a perfect reference clock, over an ensemble of measurements. The accuracy is how well a clock frequency and time compare with national standards. For stability, this is a measure of how the mean varies with respect to variables such as time, temperature, etc. The stability of a clock is how well it can maintain a constant frequency. For precision, this is a measure of the deviation of the error from the mean. The precision is indicating how precisely these quantities (accuracy and stability) can be maintained with a particular timekeeping system.

Turning to the operational approaches of certain embodiments of the present invention, certain configurations can offer mechanisms for handling multiple networks with multiple clock sources transparently to an end-to-end time distribution function. In order to accomplish some of the teachings outlined by the present invention, a definition of a time-synchronized domain (TSD) is introduced. Each TSD can include a set of nodes that are synchronized to the same time source (via either the network, or some other method, such as GPS for example). Each TSD can have defined egress/ingress edge points, where bidirectional one-way measurements can be made. A given network may have a single TSD across the entire network, or may break the network into sub-TSDs based on region, type of equipment, clock source availability, administrative barriers, etc.

Having described what a TSD may include, the discussion can move to some of the mechanisms for transporting time across the TSDs. The first is an application of PTP TC to TSDs, rather than individual nodes. The second mechanism includes definitions of inter-domain interfaces between TSDs and methods for calculating one-way delay based on the best information and techniques available on the link between TSDs. Also provided is a discovery mechanism to exchange characteristics between TSDs, as well as a specific mechanism to aid in transporting authentication information for time correction values that does not require specific hardware support for authenticating a timestamp or correction value inserted by an on-path device.

Initially, to assist transporting customer time across one or many TSDs, instead of measuring node residence time, per port peer link delay and adding per port link asymmetry compensation like IEEE1588 TC, ingress and egress TSD edge points (e.g., embodied in an edge router, server, etc.) can provide one-way correction values for the entire TSD (which is possible given that each TSD is time-synchronized at the edge points). In effect, elements of PTP TC that are currently applied to a single node are instead applied to each TSD network. Next, between each TSD, link delay should be estimated. Mechanisms may be limited, particularly in inter-domain cases such as on SP boundaries.

Turning to specific examples that may highlight some of the operational capabilities of example embodiments, FIG. 1 depicts a consumer of domain A (a triangle A illustrated by element 14), representing a slave (or the receiver of the time), which could be synchronized through a certain source. A time source A of time-scaling domain A is depicted by element 18. A set of time protocol assistants of domain D are depicted by elements 20 and 22. A set of time protocol assistant of sub-domain D1 and D2 are also provided as elements 24, 26, 30, and 32. Additionally, a time source D of time-scaling domain D is illustrated as element 28. A time source D1 of time scaling domain D1 can be synchronized to source D via element 40 and, similarly, a time source D2 of time scaling domain D2 can be synchronized to source D via element 42.

Note that the numerical designations assigned to any of these network elements do not connote any type of hierarchy; the designations are arbitrary and have been used for purposes of teaching only. These designations should not be construed in any way to limit their capabilities, functionalities, or applications in the potential environments that may benefit from the features of communication system 10.

In one embodiment, the network and the time-synchronized domain are congruent. Sub-networks and sub-domains may not be congruent. One sub-network may consist of multiple sub-domains and one sub-domain may encompass multiple sub-networks. This is dependent on operator network designs and may be based on particular needs. Network D provides a transparent network time helper function to time-synchronized domain (TSD) A (source A to consumer A). Network D can provide such synchronization functions with time protocol assistants positioned at the edge of the network D (TSD D) and at the edge of sub-networks of network D, in sub-TSDs D1 and D2. For the transparent network time helper function, time sources D1 and D2 of sub-TSD D1 and D2 either can be synchronized with time source D or can use distinct time-scales.

FIG. 1 may be generally configured or arranged to represent any communication architecture capable of exchanging packets in a network environment. Such configurations may include, for example, first generation, 2G, 2.5G, and 3G architectures that offer packet exchanging or packet switching capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol (e.g., frame relay, ATM, etc.) where appropriate and based on particular needs.

Figure 2:
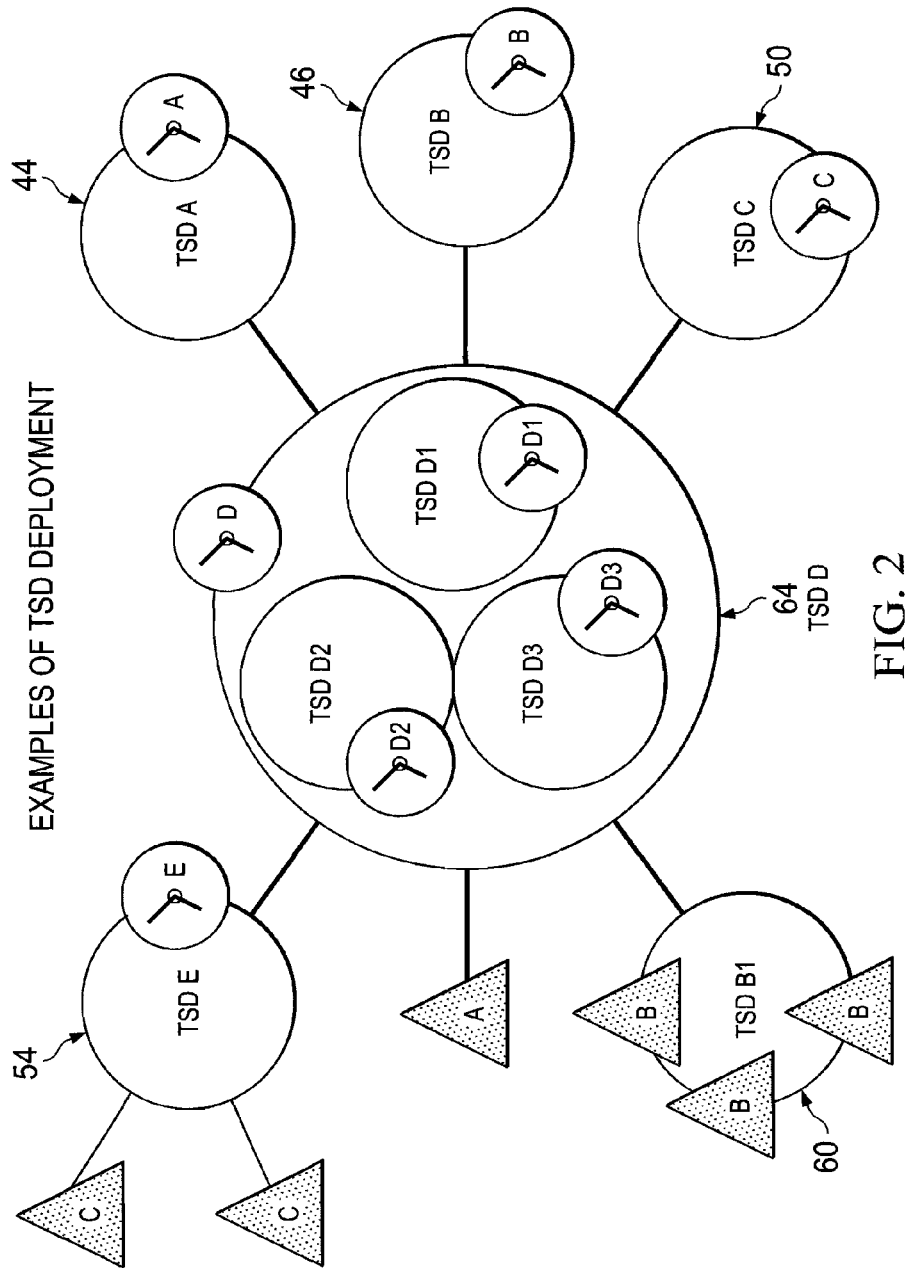
FIG. 2 is a simplified block diagram of an example time-synchronized domain associated with the communication system.

In FIG. 2, there are provided some examples of a TSD deployment. In this case, several TSD network are illustrated as TSD A (element 44), TSD B (element 46), TSD C (element 50), TSD D (element 64), TSD E (element 54), and TSD B1 (element 60). Each domain has its own time-scaling system (time source). TSD D can be divided in sub-TSD D1, D2, and D3. Each sub-TSD can be synchronized or not with time source D of TSD D. Creation of sub-domains can help in getting better precision at the edge of sub-domains. Consumer A can be synchronized with source A through network D with time source D. Consumers B are synchronized with time source B through network D (TSD D) and sub-network B1 with TSD B or sub-TSD B1. Consumers C are synchronized to time source C through network D and E with respectively TSD D and TSD E. Thus, in summary, FIG. 2 is illustrating time scales A-E, where each block has their own time source. Time source domain D has a similar arrangement, but includes multiple sub-domains, whose clocks can synchronize with the D time clock.

Figure 3:
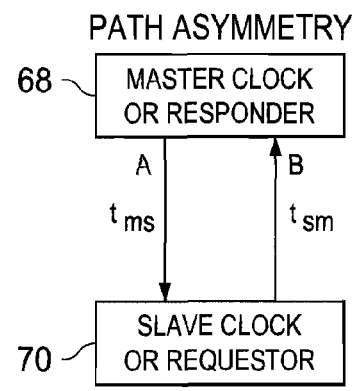
FIG. 3 is a simplified block diagram of a path symmetry configuration that may be associated with the communication system.

Taking a slight step backward to address an underlying concept related to this architecture, FIG. 3 illustrates a simple master clock or responder 68 relationship with a slave or requestor 70. This illustration helps to demonstrate an asymmetry correction for a precision time protocol (PTP) [e.g., version two] event messages. If the delay asymmetry of the paths connected to the ingress and egress ports of a clock is known, then PTP messages can be corrected, as specified below.

Messages from master to slave, and slave to master, can traverse the same network path in any system containing two-step clocks on such paths. Messages from a requestor to a responder, and from responder to requestor, can traverse the same network path in any system containing two-step clocks on such paths. They should traverse the same path in all systems to minimize asymmetry. The precision time protocol indicates that the transmission time of certain messages is measured between a master and a slave clock and between the slave and its master. For the peer delay mechanism, the transmission time between a responder and requestor, and between the requestor and responder, is measured.

Typically, these times are not the same. PTP characterizes the transmission times as follows:
<meanPathDelay>, and
delayAsymmetry.

The <meanPathDelay> is the mean value of tms and tsm, i.e. <meanPathDelay>=(tms+tsm)/2. The value of 'delayAsymmetry' is used for the computations of the actual delay in the master to slave or the responder to requestor direction. In many cases, the value of delayAsymmetry is below the error budget of the synchronization application.

The attribute delayAsymmetry can be defined as follows:

$tms$=<meanPathDelay>+delayAsymmetry, and $tsm$=<meanPathDelay>−delayAsymmetry.

In other words, delayAsymmetry can be defined to be positive when the master to slave or responder to requestor propagation time is longer than the slave to master or requestor to responder propagation time. If known, the propagation asymmetry can be modeled for purposes of correcting the timing computation.

Using the previously discussed FIGURES, three inter-domain modes of operation are defined, along with the mechanisms that apply to each. The first scenario addresses TSDs operating on different time scales, with no common time source. This means that the entities essentially have little in common with each other. The second scenario addresses TSDs operating on the same time scale, but not from a source that can be considered common. The third scenario addresses TSDs operating on the same time scale with a common time source.

From these scenarios, four modes of operation are defined. For the first mode, link delay and absolute asymmetry compensation values are configured a priori at both ends of the link for each direction. This is most applicable to scenario one, but for scenario two and three, it is still possible as one can always resort to a manual configuration override. The link delay is between TSDs. The absolute symmetry compensation values refer to a coefficient for identifying the asymmetry that exists. For example, it would be 1.0 if there were perfect symmetry. In other scenarios, communications could be faster in one direction such that the coefficient would compensate for this.

Note that the link delay (the absolute time across the link) and the absolute asymmetry compensation values are configured in advance for each link in both directions. This may involve network equipment being utilized at each link for manually determining that link characteristic. There is a subtle assumption that the link being evaluated is somewhat static and not necessarily involving an abundance of hops.

For the second mode, a round-trip message implies that the peer that you may be communicating with only has to turn the message around and give it back to the other peer. The time sync (between two boxes) is not a necessity. Round-trip peer-delay messages (from a time protocol as such as the IEEE1588 peer delay mechanism, or Operation, Administration, and Maintenance (OAM) mechanisms such as Bidirectional Forwarding Detection [BFD]) are sent over the link to obtain mean delay round trip time (RTT) measurements, but asymmetry compensation values are configured a priori at both ends of the link for each direction. Elements may be configured a priori because there may be only a RTT mechanism on which to rely. It is easier to use an RTT mechanism because only one side of the link is time enabled, whereas the other side of the link may be more conventional.

This provides a bit more coordination on behalf of the TSD edge equipment (both sides have to be capable of sending and returning an OAM or time packet probe), but can increase accuracy and reduce manual configuration. The delay in both directions can be added together, which avoids asymmetry problems. This case is most applicable for scenario one, but could be used in two and three as well.

For the third mode, in scenario two and three, the TSDs are known to operate on the same time scale, allowing for ease of relative time calculations between the TSDs (even if not synchronized to the same time source, as in scenario two). Thus, for scenario two or three, this mode of operation is defined, which does not require any a priori configuration of asymmetry compensation values or other manual delay measurements. The same type of round-trip peer-delay probing mechanism is used, as was employed in the second mode. Asymmetry can be calculated automatically via long-averaged unidirectional delay measurements between TSD edge routers. This asymmetry compensation value is then used together with the peer-delay message RTT results across the link to obtain the necessary one-way link delay measurements.

For the fourth mode, in scenario three, there is full synchronization for time between TSDs. Link delay and asymmetry can be calculated dynamically and automatically via timestamps as packets traverse the ingress and egress points of the TSD. Alternatively, a separate probing or OAM mechanism utilizing one-way time-stamps may be utilized with the results sent as a separate, out of band message.

Naturally, the fourth mode is ideal, but one can only do this if the two TSDs are synchronized to the same source clock (which in the case of sub-TSDs within the same network. The first mode allows the most autonomy between TSDs, but this depends on manual configuration and does not react to variations in transmission delay, link transients, etc. The second and third modes are compromises between the two, based on what is known about TSD edge router capabilities and time synchronization status.

In order to determine whether a given TSD edge interface (e.g., that which would reside in a router) need rely on modes one-four, extensions to a link discovery protocol could be defined to determine the capabilities of the peer link in terms of time-stamping and the like, as well as what time scale (or scales) and time source to which the device (e.g., a router) is currently synchronized. In this way, the device (e.g., routers) may automatically use the most accurate mechanism available, as well as react to potential changes in time scale synchronization between one TSD and another.

To transmit the correction values for the transparent clock to clients, the edge points of the TSD may use any number of mechanisms, such as those discussed herein. The packet goes over the TSD and all the way back to the client to indicate as the synchronization packet traversed its TSD. This identified time interval represents how long it took. Indirectly, this identification is instructing the other side to correct their synchronization accordingly.

One mechanism could leverage any correction field already available in the client's time protocol (e.g., in IEEE1588-2008 PTP messages). Another mechanism would be a time protocol extension (e.g., TLV or NTPv4 extension). Rather than changing fields, information could be added to a packet in this mechanism. The added information would relate to a given domain and how long it took to traverse that domain. In this case, it may be left up to the client to work out this issue.

Another mechanism would provide an encapsulation of the client's time protocol in a tunnel carrying TSD corrections in an independent format. Such encapsulation may start at the first edge point crossed by the client's time protocol, or could be initiated by the client's time source as well. The tunnel could traverse the aforementioned tunnel and could include the various time information that presumably is added and discarded as the network is left.

Yet another mechanism would separate "out-of-band" correction messages sent directly by the TSD edge router to the client or to another TSD router, in particular the TSD router nearest to the client. These "correction messages" may contain time correction values that were not able to be added directly to client time protocol packets due to hardware limitations on the TSD edge routers, or simply carry additional information that was not able to be added by the time-stamping hardware (such as an authentication hash over the timestamp, or information about link characteristics changes, routing updates, etc.).

In terms of security and authentication issues, in inter-domain scenarios crossing administrative boundaries, security threats generally increase and require addition tools. The obvious approach for securing time packets is to distribute keying information between the various parties involved and employ a hashing function across each packet in order to identify packets that may have been tampered with in transit. While secure, this method requires not only the ability to time stamp a packet in hardware, but also to apply a hashing function on transmit and a check on that function on receipt.

In cases where such authentication functions do not exist in hardware, a new "out-of-band" security message is defined that is sent (either immediately or periodically) as a normal packet, which will not require time stamping (mode four above). This message may be sent, for example, over a typical IPSec SA between TSD routers, or between a TSD router and time clients. These messages contain authentication hashes of time-stamps sent in earlier time protocol messages, and can be checked out of band from the time protocol messages themselves. This naturally creates the likelihood that, in the presence of an attack, some number of rogue time protocol messages may be received and processed normally. However, time synchronization algorithms typically do not make marked movements from a small number of protocol messages and can filter out large variations. Thus, the damage is likely small, while the knowledge that rogue messages were in fact received, even after the fact, could trigger vital security alarms, as well as providing valuable data for determining historical reliability of the time synchronization service being provided.

Figure 4A:
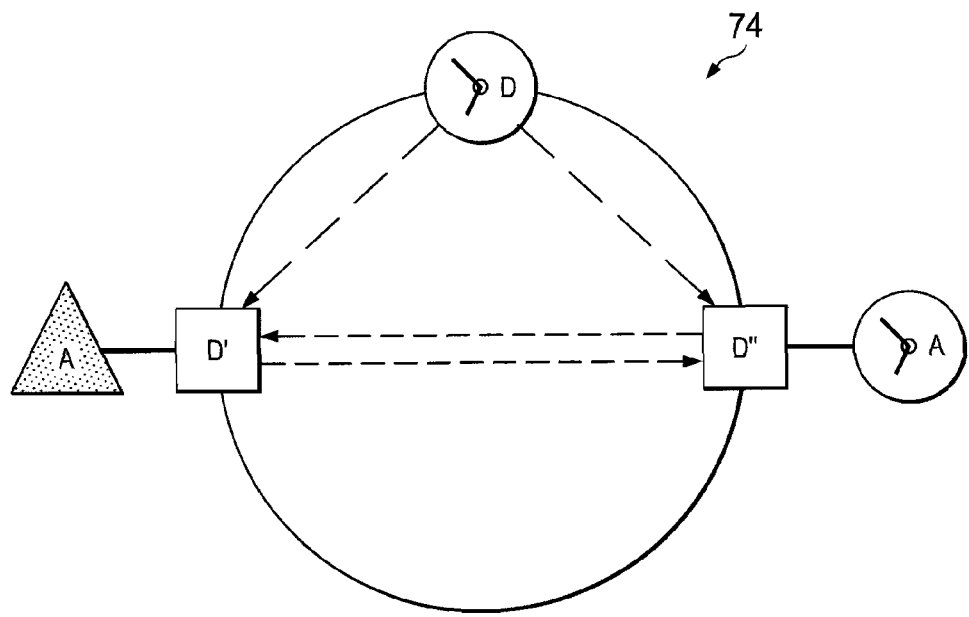
FIGS. 4A-8 are simplified block diagrams that illustrate example operational activities associated with the communication system.
Figure 4B:
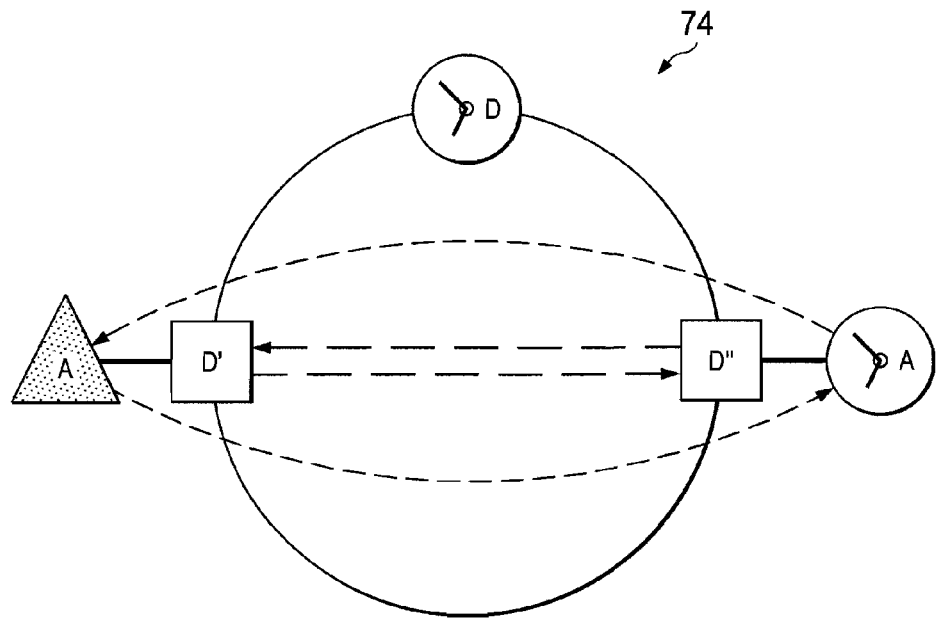

FIG. 4A is a simplified block diagram depicting another example in accordance with one embodiment of the present invention. FIG. 4A includes an element 74, which includes time protocol assistants and a consumer. Specifically, domain D, TSD D, provides a transparent network time helper function to TSD A between source A and consumer A. Time protocol assistants D' and D" are synchronized with time source D. What is measured (respectively) is a one-way delay D"→D' and D'→D". This example is continued in FIG. 4B.

Time protocol assistants D' and D" can measure intra-domain one-way delays between each other and provide an asymmetry value over a long period (average). They can also provide delay variation correction within the domain for every protocol packet in each direction. Time protocol assistants can time-stamp time protocol messages in both directions at ingress and egress of their domain. In one example, D' computes the corrections for messages from time source to consumer (e.g., PTP Sync or Delay Response) and D" computes the corrections for messages from consumer to time source (e.g., Delay Request).

Figure 4C:
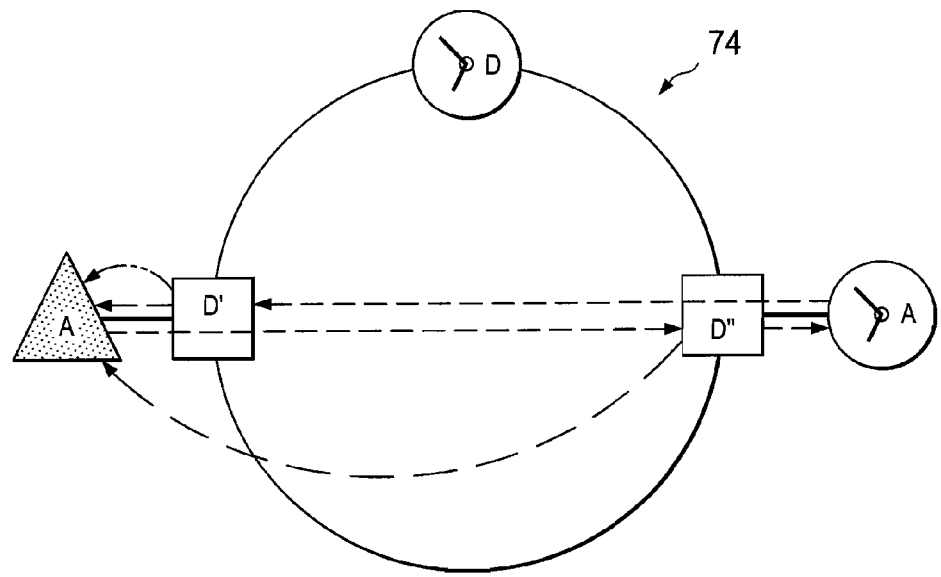

This example continues with FIG. 4C. Consumer A can receive the time-stamps or/and delay correction values to be processed. This can be accomplished either by using the time protocol correction field if it exists (i.e., IEEE1588-2008 PTP messages), or by using a type, length, value (TLV), or an extension of the time protocol payload (e.g., NTPv4 extension field). This could also be accomplished by encapsulating the time protocol. The encapsulation method allows the original time protocol to be independently authenticated or encrypted. Authentication of correction information can be done separately by the transparent network time helper.

Figure 5A:
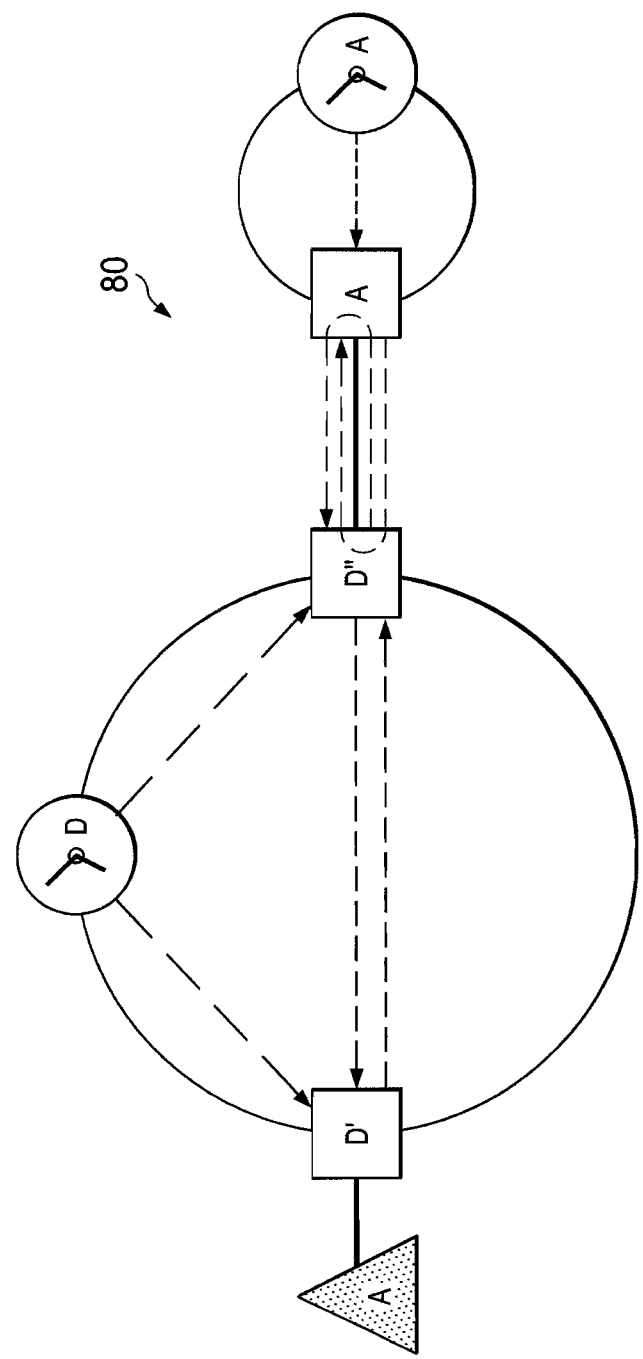

FIG. 5A illustrates another example and includes element 80. Domain D provides a transparent network time helper function to time-scaling domain A between source A and consumer A. In this example, time protocol assistants D' and D" are synchronized with time source D and time protocol assistant A is synchronized with time source A. Time protocol assistants D' and D" behave as in the example of FIG. 4A. Time protocol assistant D" measures a mean delay with time protocol assistant A and time protocol assistant A measures a mean delay with time protocol assistant D". Note that because A and D" are not in the same time-scaling domain, only a mean is being measured in this example.

Figure 5B:
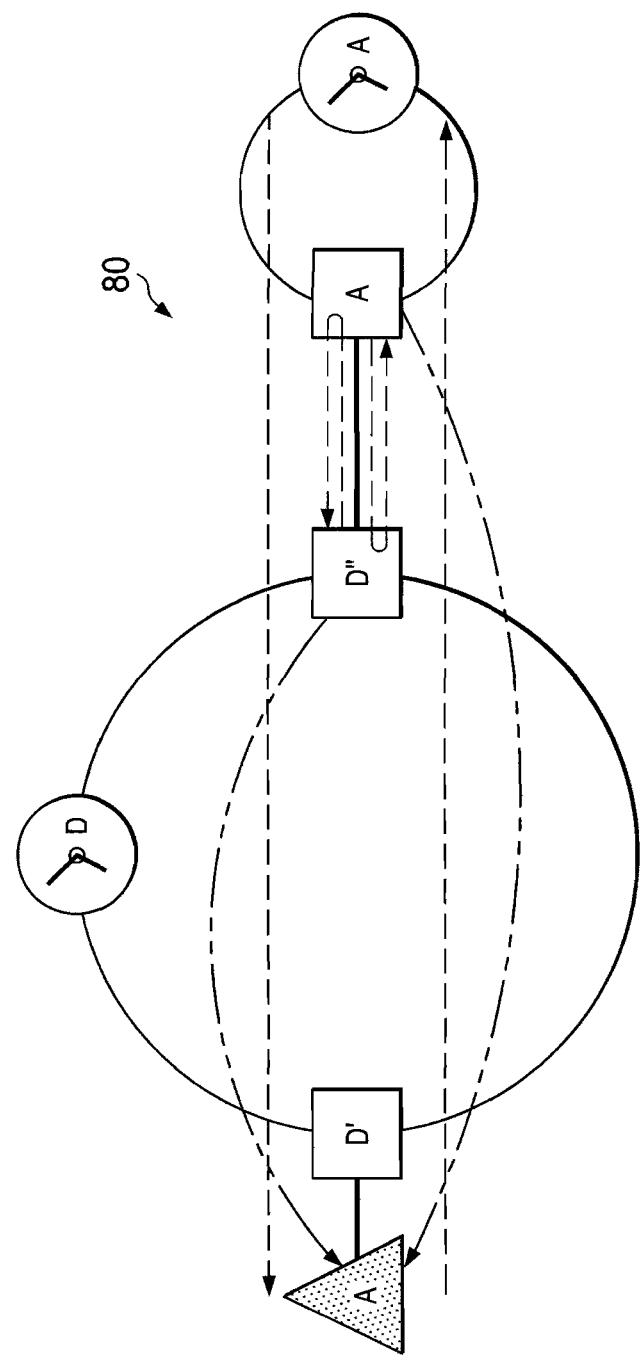

This example continues with FIG. 5B, where mean delay values calculated by time protocol assistants A and D" can be added to correction values provided to consumer A. Time protocol assistant A can correct for messages from consumer to time source. Time protocol assistant D" can correct for messages from time source to consumer.

Figure 6A:
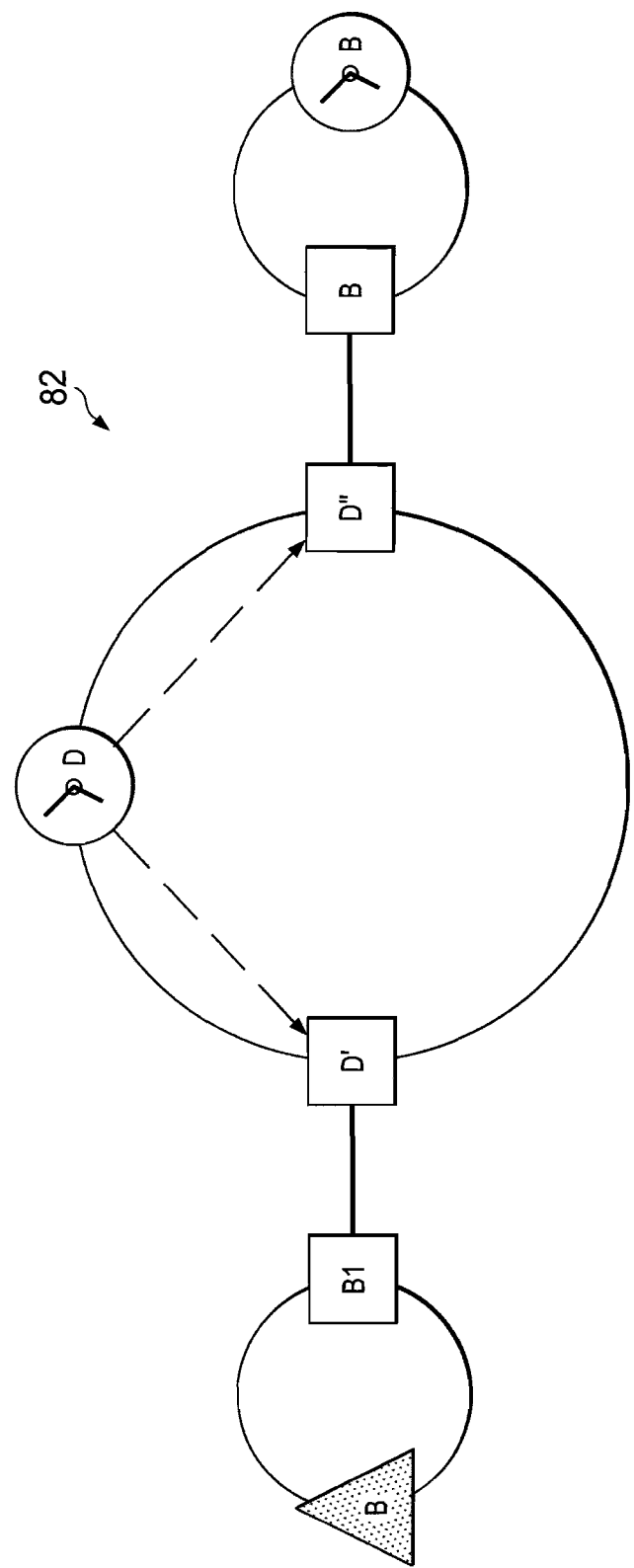

FIG. 6A illustrates another example and includes element 82. Domain D provides a transparent network time helper function for time-scaling domain B between source B and consumer B. Time protocol assistant B1 provides a transparent network time helper function to consumer B. Time protocol assistant B1 can use a free-running clock. If time protocol assistant B1 is synchronized to time-source B, it can use a transparent network time helper function from domain D. If this requirement is to time-align consumers in TSD B1, consumers of domain B1 can synchronize to time protocol assistant B1, thus, creating the sub-domain (sub-TDS) B1.

Figure 6B:
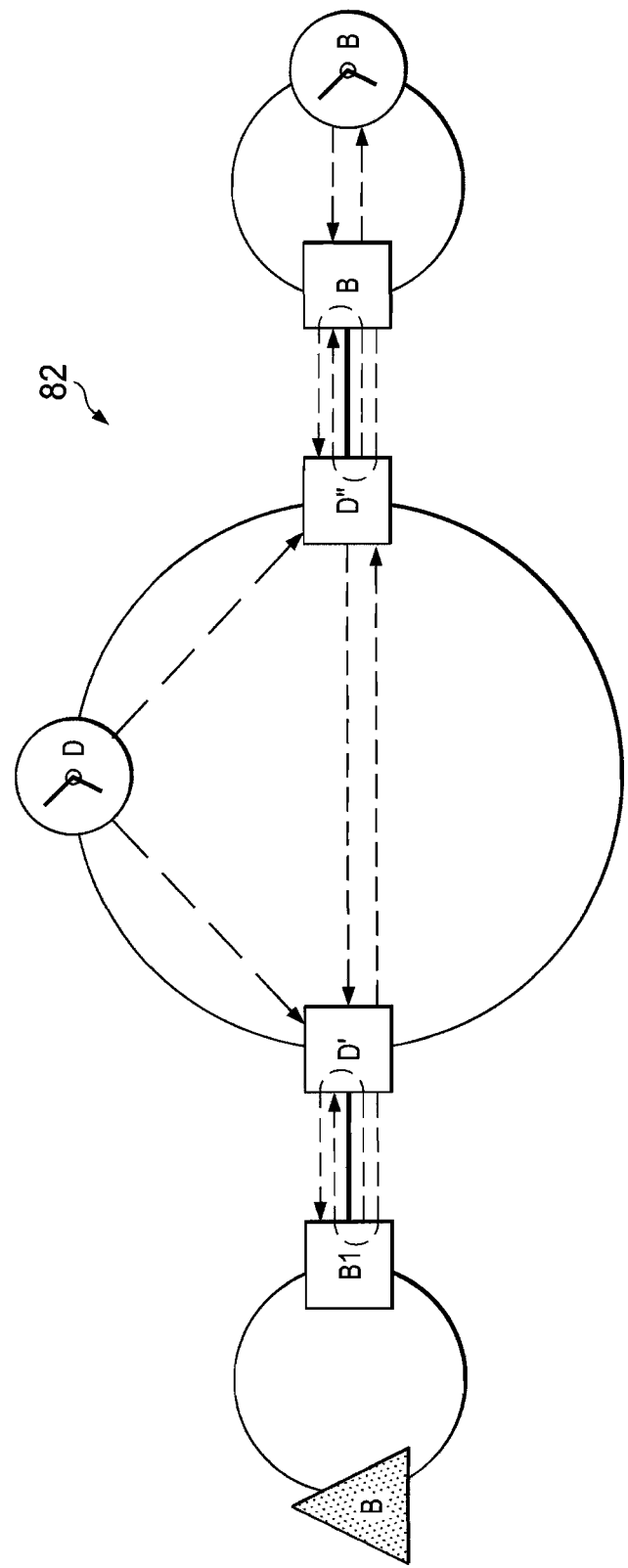

This example continues with FIG. 6B, where time protocol assistants D" and B and time protocol assistants B1 and D' can measure the mean delay on their respective link connection. Source B and time protocol assistant B can measure one-way delays. If the method of encapsulating the time protocol messages is used, time protocol assistants B and B1 can either update a correction field of the time protocol if such field exits, or update a correction field of the encapsulation protocol. Time protocol assistants D" and D" should update the correction field of the encapsulation protocol.

Figure 7A:
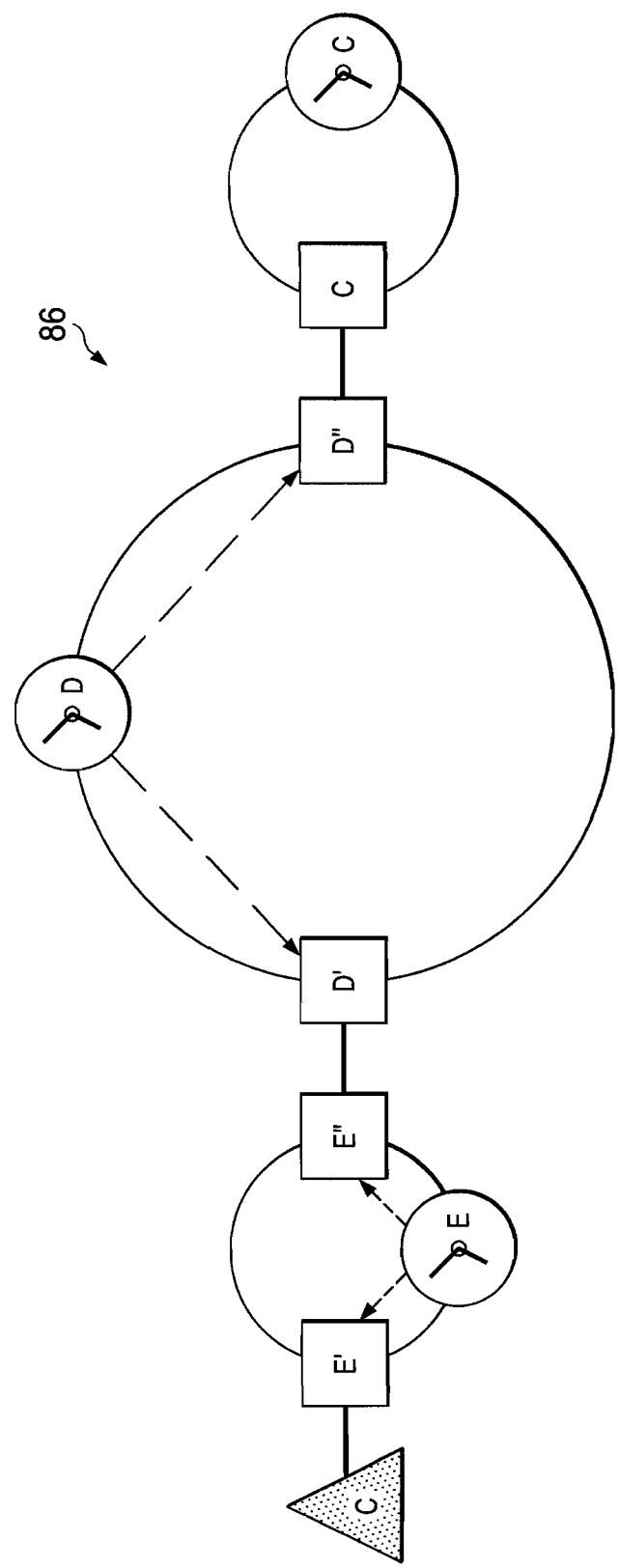

FIG. 7A illustrates another operational example and includes element 86. TSDs D and E are independent TSDs and provide a transparent network time helper function for TSD C between source C and consumer C. Time protocol assistants E' and E", as well as D' and D", measure intra-domain one-way delays. Time protocol assistants D' and E", as well as D" and C, measure inter-domain mean path delays. In using encapsulation method, consumer C can authenticate source C and time protocol assistants of domains D and E can provide distinct authentication of the correction information.

Figure 7B:
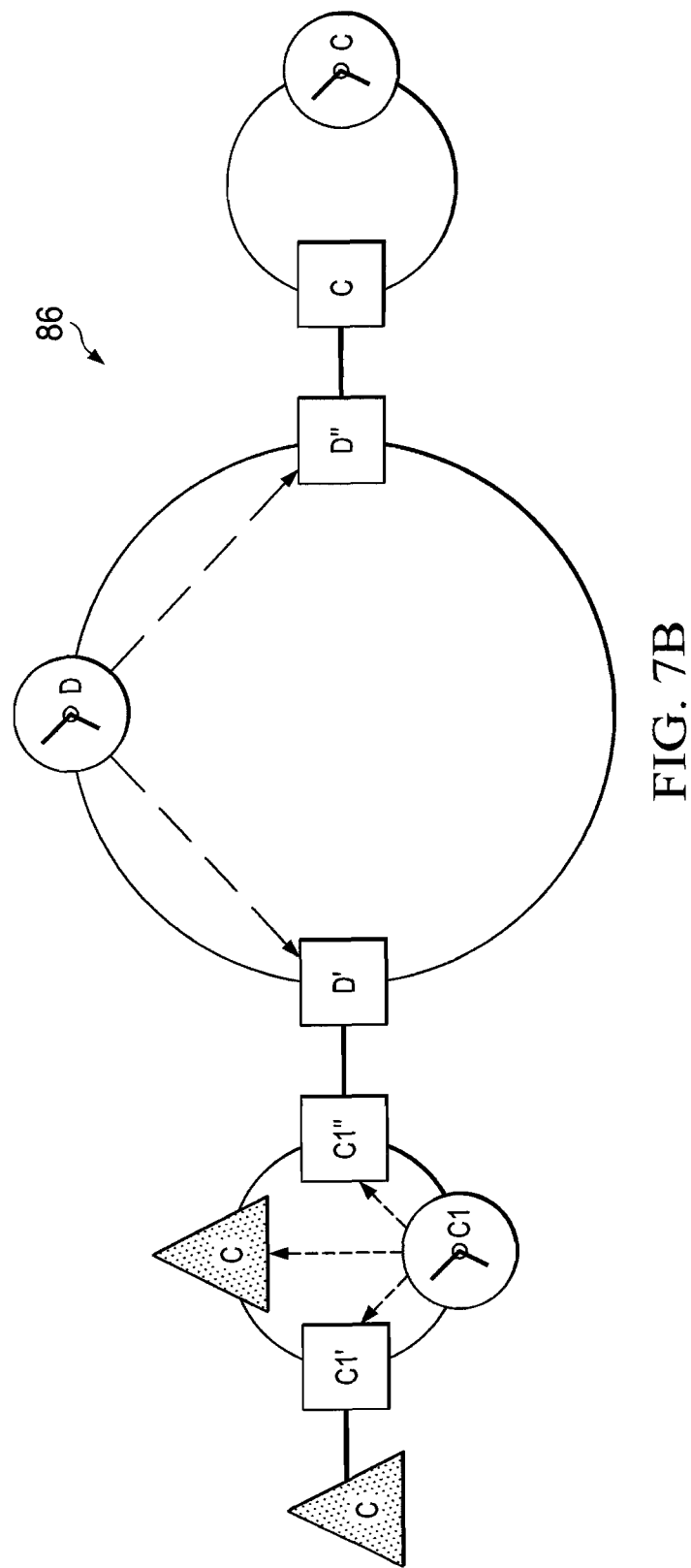

This example continues with FIG. 7B, where network E can also be a sub-network owned by operator C. TSD C1 with time protocol assistants C1' and C1" can provide a transparent network time helper function for consumer C. Time source C1 can remain a distinct TSD (not synchronized to C). This can be sufficient for time alignment of consumers in domain C1. If source C1 is synchronized to source C and consumers in TSD C1 need synchronization with source C, source C1 can provide intra-domain time synchronization.

Figure 8:
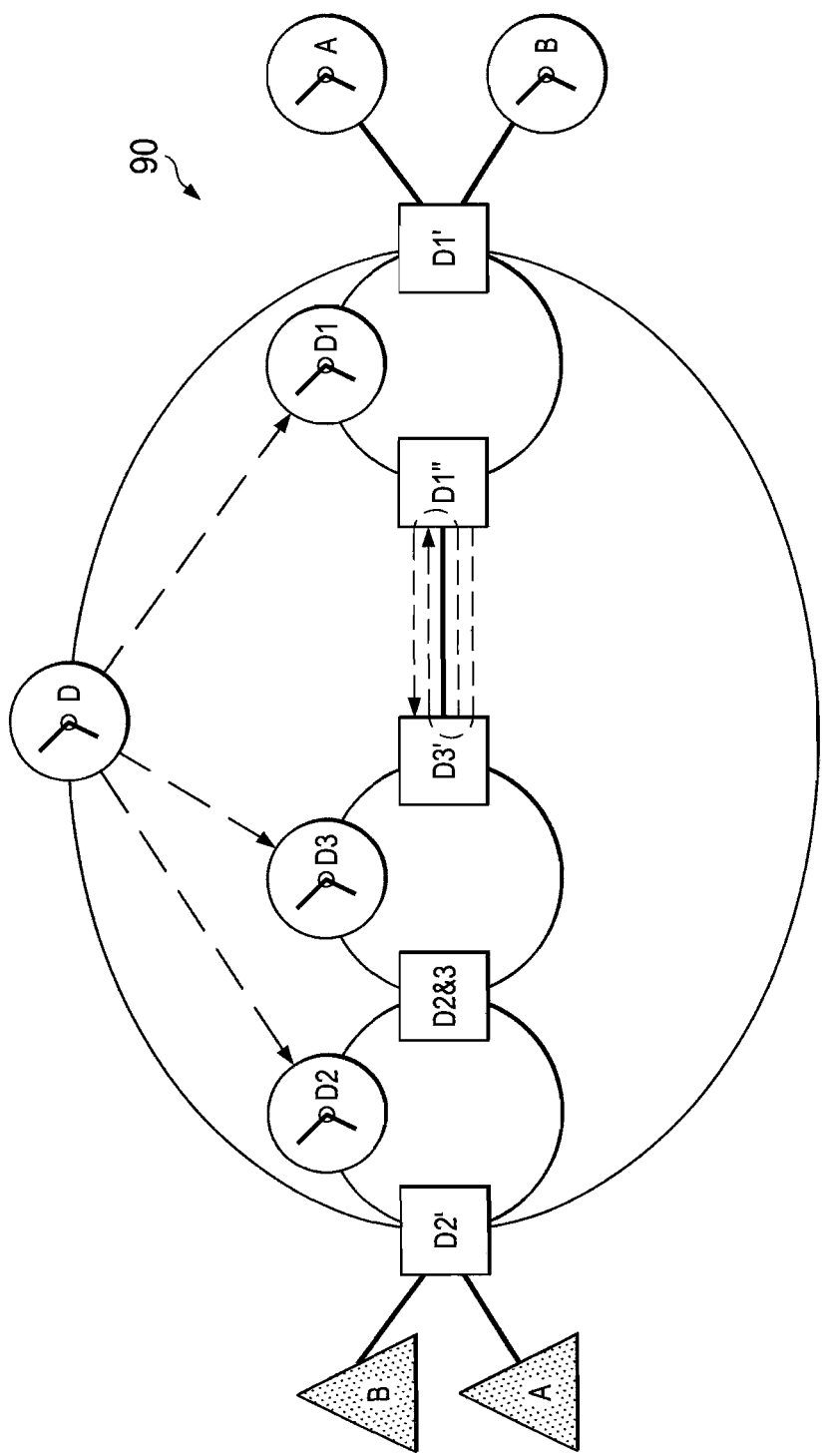

FIG. 8 is a simplified block diagram of an operator network 90 with time-scaling sub-domains. A large network and TSD can be divided in multiple sub-TSDs. Sub-TSDs may be synchronized to a main time source or they may run independently. Being synchronized allows measuring of a one-way delay between time protocol assistants of distinct sub-domains (e.g., D1" and D3'). This allows use of a unique time protocol assistant between two sub-domains (e.g., D2 and D3). However, the solution to retain this can be the one that provides the best quality for a transparent network time helper function to customers.

In terms of protocol considerations, time distribution can use a two-way transfer time protocol. Time protocol messages can be bi-directional [to and from consumer and time source]. Time protocol messages generally include timestamp fields. Correction values can be sent to consumers in some manner, for example, by using a time protocol correction field if it exists (i.e., IEEE1588-2008 PTP messages). Alternatively, this can be done by using a TLV or an extension of the time protocol payload (e.g., NTPv4 extension field), or by encapsulating the time protocol messages into another messages with correction fields. Encapsulation methods allow the original time protocol to be independently authenticated or encrypted. Authentication of correction information can be done separately by a transparent network time helper. Each time protocol assistant, TSD or sub-TSD can independently authenticate correction information. By using one-way delay measurements, the asymmetry correction can be optimized. As such, it may be possible to use distinct paths between time protocol assistants (TPAs). If the same path is preferred, then traffic engineering could be used between time protocol assistants, but not necessarily between edges of the network.

In regards to the time protocol assistants, for IEEE1588-2008, the transparent clock could be syntonized to the grandmaster (GM). This is suggested in order for the TC measurement to be congruent with original GM frequency [i.e. making their time-bases "equal"]. PTP TC can perform residence time measurement from ingress to egress ports. A TPA is usually measuring a transparent network time helper domain delay. There is a need for accurate, stable, and precise time synchronization between the TPAs of a domain. In a telecom operator network, it is expected that the frequency signal would be traceable to stratum 1 (e.g., G.811). Every domain time source and TPAs could receive such a frequency traceable signal to allow stable time measurement.

In regards to some of the possible infrastructure that can be used to carry out some of the operations discussed herein in this Specification, a network element could be provided at the edge of the network to facilitate, assist, or process the discussed synchronization activities. As used herein in this Specification, the term 'network element' is meant to encompass routers, switches, gateways, bridges, loadbalancers, firewalls, servers, or any other suitable device, component, element, or object operable to exchange packets in a network environment. Moreover, these network elements can include the time protocol assistants and/or the helper functionality described herein.

These network elements (e.g., positioned on the edge of the network) may include any suitable hardware, software, components, modules, interfaces, or objects that facilitate the operations thereof. This may be inclusive of appropriate algorithms and communication protocols that allow for the effective exchange of data or information.

In one example implementation, these network elements include software and/or hardware to achieve the synchronization operations, as outlined herein in this document. In other embodiments, this feature may be provided external to these elements or included in some other device to achieve this intended functionality.

Each of these network elements can also include suitable memory elements for storing information to be used in achieving the synchronization operations as outlined herein. Additionally, each of these items may include a processor that can execute software or an algorithm to perform the synchronization activities as discussed in this Specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

In operation of an example implementation, a TSD with time-synchronized nodes at ingress and egress is defined that allows one or more TSDs to be properly configured. The TSDs can be made up of multiple routers and switches to operate as a single entity for providing a functionality similar to that of an individual node in an IEEE 1588 PTP transparent clock deployment. Ultimately, this could allow multiple time protocols each synchronized to their own time source and scale, to be carried independently over one or more TSDs, without requiring specific hardware support at all hops within each TSD.

In regards to an example business use case (e.g., Enterprise or SP), a large network may need to support time distribution of one scale (e.g., TAI), but have routers that are synchronized to another source (e.g., UTC via GPS). By using the defined TSDs and edge-TSD routers, a transparent clock functionality is achieved while reducing the number of overall nodes needing specific hardware support.

For another example business use case (e.g., single SP), hardware time-stamping functions in TSD edge routers or switches allow an SP to support a high-quality distribution of time. This occurs without requiring the SP network itself to be synchronized to the same time source/scale being distributed. This is particularly interesting when supporting multiple customers, each with different time scales and sources.

For another example business use case (e.g., multiple SPs), this allows each service provider to be synchronized to its own time source. This would occur while still supporting high-quality distribution of time for customers with other time scales and sources. This is particularly relevant when transporting time across multiple service providers, or over the Internet at large.

Note that by defining a TSD and using the mechanisms defined herein, correction factors between TSD edge routers may be provided without requiring hardware support for all nodes in transit. This would be in contrast to the case with IEEE1588, for example. Typically, large, expensive routers are built with time stamping support, while a number of switches are not being built with ubiquitous time distribution support.

Again referencing an example business use case, there is an ease of configuration on inter-domain links for distribution of high-quality time. Ease of configuration leads to greater likelihood of high-quality time distribution being made available across multiple TSDs, and at less operational cost to the provider. Additionally, out-of-band messages are also provided as a viable part of the proffered solution. These messages are distinct from the conveyed PTP or NTP packets, sent directly from TSD edge routers to the client or another TSD edge router to transmit correction values, authentication/security information, or other information about the TSD such as link transients reported by the routing system, etc. These messages may be a new protocol or use an existing router-to-router protocol, but the main point is that they are independent of the time protocol being transported over the network.

In terms of an example business use case (e.g., time protocol independence, integration with routing system), a provider network may need to support time distribution from a customer network using distinct time protocols. Timestamp correction information, reports of network transients, etc. being reported specifically between TSD edge routers, and optionally back to the clients themselves, allows the time correction capabilities to remain independent of the time protocol being transported.

In regards to inter-TSD security, example embodiments of the present invention offer a mechanism to avoid timestamps at the edge of TSDs. Sometimes, these timestamps look like 'man-in-the-middle' attacks to existing time protocols, and they use of an out-of-band authentication message to secure timestamps across domains without additional hardware support to hash each in-band time protocol timestamp. Security is an important concern. When time stamping packets that are crossing domains, end-to-end security, as well as security of correction factors provided at each TSD, should be used. Hardware may not be capable of time stamping packets in transit, while also providing a secure hash of the timestamp itself. Usage of a separate security message provides a balance between additional hardware support, while providing reasonable security for time-stamps.

In regards to encapsulation of a two-way-time-transfer-protocol (TWTTP) such as NTP or PTP, there is a need for carrying separate timestamp and authentication information while keeping the original NTP and PTP protocols intact. This is more specific than above, employing a tunneling mechanism for the time protocol of choice rather than trying to convert between one another (e.g., boundary clock function).

In another example business use case (e.g., for time protocol independence), a network may need to support time distribution from a customer using distinct time protocols. Considering the demand for increased precision, a protocol like NTP may be enhanced with features from IEEE1588. A service provider with IEEE1588 support may want to remain independent of the NTP distribution, while still enhancing it. For an example business use case (e.g., separate security domains), a client may authenticate the time protocol packet between source/master and client/slave. Tunneling can provide a way to transmit authenticated correction information (assuming proper hardware support), while keeping the end-to-end time protocol message intact.

When a given TSD can behave as an IEEE 1588 transparent clock in an end-to-end mode, the inter-TSD methods defined herein allow separate TSDs to behave like IEEE 1588 TC peer-to-peer. For another example business use case, the concept described herein can automatically adapt to various link types between TSDs. TSD being a TC-type function, each TSD can function in end-to-end or peer-to-peer mode. Using measurements between TSDs can improve the quality time distribution particularly if the inter TSD link is virtual, or in using a lambda connection with multiple WDM switches.

Note that with the examples provided herein, interaction may be described in terms of two, three, or four elements. However, this has been done for purposes of clarity and example only. In certain cases, it may be easier to describe one or more of the functionalities of a given set of flows by only referencing a limited number of network elements. It should be appreciated that network elements (and their teachings) are readily scalable and can accommodate a large number of components, as well as more complicated or sophisticated arrangements and configurations. Accordingly, the examples provided should not limit the scope or inhibit the broad teachings of these concepts, as potentially applied to a myriad of other architectures.

It is also important to note that the steps described with reference to FIGS. 1-8 illustrate only some of the possible scenarios that may be executed by, or within, the illustrated architectures. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the proffered configurations in that any suitable arrangements, chronologies, configurations, and timing mechanisms may be provided without departing from the teachings of the present invention. While certain hardware and/or software have been identified (e.g., a RAM, a ROM, a standard for assisting in the conversion or propagation of data), this has only been done in an effort to offer simply one, of potentially countless arrangements for the present invention. In no way should such examples be construed as limiting or confining, as the present invention contemplates any number of possible alternatives and permutations to these proffered examples.

Numerous other changes, substitutions, variations, alterations, and modifications may be ascertained to one skilled in the art and it can be intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a time protocol assistant associated with a time synchronized domain (TSD) that includes a set of nodes synchronized to a same time source, wherein at least instances of the time protocol assistant are coupled to egress and ingress edge points of the TSD where bidirectional measurements can be made, and wherein packets flowing through a network that includes the TSD are synchronized through the same source, and wherein link delay and asymmetry compensation values are configured a priori by the instances of the time protocol assistant at the ingress and egress edge points at both ends of a link for each direction in a communication flow that traverses the TSD, wherein an additional TSD is provided in the network and a link delay is estimated between each of the TSDs based on timestamps of the packets traversing the egress and ingress edge points.

2. The apparatus of claim 1, wherein the same time source is a grandmaster clock that synchronizes one or more transparent clocks.

3. The apparatus of claim 2, wherein the transparent clocks manipulate precision time protocol (PTP) packets sent by the grandmaster clock.

4. The apparatus of claim 1, the TSDs operate on different time scales with no common time source.

5. The apparatus of claim 1, wherein the TSDs operate on a same time scale, but not from a source that is common.

6. The apparatus of claim 1, wherein the TSDs operate on a same time scale with a common time source.

7. The apparatus of claim 1, wherein the assistant is provided at the edge of a network and included in a selected one of a group of network elements, the group consisting of:
   a) a router;
   b) a switch;
   c) a gateway;
   d) a server;
   e) a loadbalancers;
   f) a firewall; and
   g) a bridge.

8. The apparatus of claim 1, wherein for every clock source there exists a time-scaling domain.

9. The apparatus of claim 1, wherein a sub-network that includes the TSD includes multiple sub-domains and one sub-domain includes multiple sub-networks.

10. The apparatus of claim 1, further comprising:
   a transparent network time helper element, which is configured for synchronizing packets in the TSD.

11. The apparatus of claim 1, wherein the ingress and egress edge points provide one-way correction values for the TSD.

12. A method, comprising:
   providing at least instances of a time protocol assistant associated with a time synchronized domain (TSD) that includes a set of nodes synchronized to a same time source, and wherein the at least instances of the time protocol assistant are coupled to egress and ingress edge points of the TSD where bidirectional measurements can be made; and
   synchronizing one or more packets flowing through a network that includes the TSD through the same time source, wherein link delay and asymmetry compensation values are configured a priori by the instances of the time protocol assistant at the ingress and egress edge points at both ends of a link for each direction in a communication flow that traverses the TSD, wherein an additional TSD is provided in the network and a link delay is estimated between each of the TSDs based on timestamps of the packets traversing the egress and ingress edge points.

13. The method of claim 12, wherein the same time source is a grandmaster clock that synchronizes one or more transparent clocks.

14. The method of claim 13, wherein the transparent clocks manipulate precision time protocol (PTP) packets sent by the grandmaster clock.

15. The method of claim 14, wherein the TSDs operate on different time scales with no common time source, and wherein for every clock source there exists a time-scaling domain.

16. A system, comprising:
   means for providing at least instances of a time protocol assistant associated with a time synchronized domain (TSD) that includes a set of nodes synchronized to a same time source, and wherein the at least instances of the time protocol assistant are coupled to egress and ingress edge points of the TSD where bidirectional measurements can be made; and
   means for synchronizing one or more packets flowing through a network that includes the TSD through the same time source, wherein link delay and asymmetry compensation values are configured a priori by the instances of the time protocol assistant at the ingress and egress edge points at both ends of a link for each direction in a communication flow that traverses the TSD, wherein an additional TSD is provided in the network and a link delay is estimated between each of the TSDs based on timestamps of the packets traversing the egress and ingress edge points.

17. The system of claim 16, wherein the same time source is a grandmaster clock that synchronizes one or more transparent clocks, and wherein the transparent clocks manipulate precision time protocol (PTP) packets sent by the grandmaster clock.

18. The system of claim 16, and wherein the TSDs operate on different time scales with no common time source, and wherein for every clock source there exists a time-scaling domain.

19. One or more non-transitory tangible media for performing operations, comprising:
   providing at least instances of a time protocol assistant associated with a time synchronized domain (TSD) that includes a set of nodes synchronized to a same time source, and wherein the at least instances of the time protocol assistant are coupled to egress and ingress edge points of the TSD where bidirectional measurements can be made; and
   synchronizing one or more packets flowing through a network that includes the TSD through the same time source, wherein link delay and asymmetry compensation values are configured a priori by the instances of the time protocol assistant at the ingress and egress edge points at both ends of a link for each direction in a communication flow that traverses the TSD.

20. The media of claim 19, wherein the same time source is a grandmaster clock that synchronizes one or more transparent clocks.

21. The media of claim 19, wherein the transparent clocks manipulate precision time protocol (PTP) packets sent by the grandmaster clock.

22. The media of claim 19, wherein the ingress and egress edge points provide one-way correction values for the TSD.

* * * * *